(12) United States Patent
Schaer et al.

(10) Patent No.: US 6,786,683 B2
(45) Date of Patent: Sep. 7, 2004

(54) HAND TOOL WITH ELECTRONIC DEPTH STOP

(75) Inventors: Roland Schaer, Grabs (CH); Christoph Würsch, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 120 days.

(21) Appl. No.: 10/098,835

(22) Filed: Mar. 13, 2002

(65) Prior Publication Data
US 2002/0146295 A1 Oct. 10, 2002

(30) Foreign Application Priority Data
Apr. 10, 2001 (DE) .......................... 101 17 952

(51) Int. Cl.[7] .................. B23B 39/00; B23B 39/04; B23B 49/00
(52) U.S. Cl. ................. 408/16; 408/7; 408/8
(58) Field of Search ............ 408/7, 8, 14, 15, 408/16

(56) References Cited

U.S. PATENT DOCUMENTS

| | | | |
|---|---|---|---|
| 4,272,821 A | * 6/1981 | Bradus | 700/168 |
| 4,317,176 A | * 2/1982 | Saar et al. | 700/168 |
| 4,723,911 A | * 2/1988 | Kurtz | 433/27 |
| 4,813,312 A | * 3/1989 | Wilhelm | 81/467 |
| 4,968,146 A | * 11/1990 | Heizmann et al. | 356/623 |
| 5,203,650 A | * 4/1993 | McCourtney | 408/1 R |
| 5,404,021 A | * 4/1995 | Mangano et al. | 250/559.29 |
| 6,474,378 B1 | * 11/2002 | Ryan et al. | 144/154.5 |
| 6,520,270 B2 | * 2/2003 | Wissmach et al. | 173/170 |
| 2002/0129948 A1 | * 9/2002 | Wursch et al. | 173/4 |
| 2002/0164217 A1 | * 11/2002 | Peterson | 408/1 R |

* cited by examiner

*Primary Examiner*—A. L. Wellington
*Assistant Examiner*—Brian D. Walsh
(74) *Attorney, Agent, or Firm*—Sidley Austin Brown & Wood, LLP

(57) ABSTRACT

A hand tool device (1), for a partially rotationally driven drill tool (2), including an electronic depth stop (3) with a sensor (4) for non-contacting gauging of a distance and a calculator component (5) for calculating the depth (T) of a drill bit tip (8) relative to a reference surface (10), and signaling when a measured value attains a set value (S). The set value (S) can be transmitted into a set value memory (6) using a single manually operated transfer accept actuation.

8 Claims, 1 Drawing Sheet

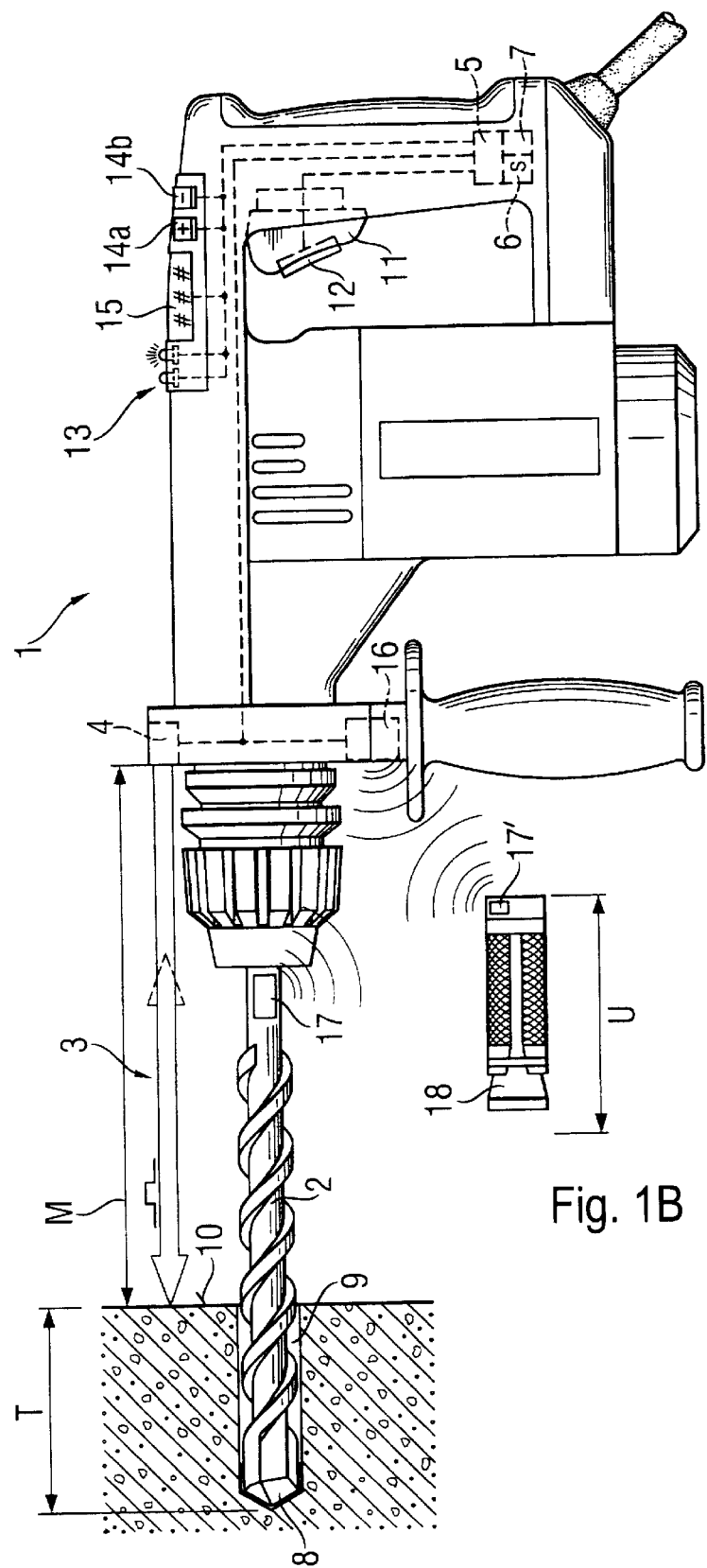

HAND TOOL WITH ELECTRONIC DEPTH STOP

BACKGROUND OF THE INVENTION

The invention relates to an at least partially rotational hand tool device, such as a drill or a percussion drill, with an electronic depth stop.

A depth stop is suitable for producing blind bore holes of a set depth, wherein the depth stop prevents further material removal at the tool tip after reaching the desired depth. In the construction industry, adherence to a certain blind bore hole depth is important, particularly, for setting highly loaded anchorages, because in setting undercut anchors, the depth of the blind bore hole is matched to the anchor.

According to DE 3214182, a rodlike depth stop for a percussion drill is disclosed, which prevents further penetration of the tool upon contact with the work piece. According to JP 62188612, the rodlike depth stop can simply be set at a desired value by using a lock button. According to DE 3912991, a resilient spring-loaded, adjustable, rodlike depth stop interrupts the current circuit to the drive upon reaching the set value. Such blocking depth stops are frequently distracting to the user and are, therefore, undesirable in the construction industry.

According to DE 2838968, an electronic depth stop has US-, HF-, or Laser measurement technology sensors, which determine the distance between the tooling surface and the sensor on the hand tool device to calculate the depth. A calculation means interrupts the current circuit of the drive after reaching the set depth.

According to DE 2855217, the set value for an electronic depth stop is set directly via a potentiometer. An optical or acoustic indication provides a signal indicating when the tool tip reaches the set depth of the blind bore hole. In the construction industry, the direct adjustment of a set value is subject to error on fleeting actuation.

EP 0659525 discloses a drill hammer having a microprocessor for controlling rotational torque and a graphic display with a numerical and symbolical display and two large surface area Up-Down buttons for input.

The object of the present invention is to provide a method of simple entry of a set value for the depth of a blind bore hole, in a hand tool device with an electronic depth stop.

SUMMARY OF THE INVENTION

The object is generally achieved by the invention, wherein a hand tool device for an at least partially rotationally driven drill tool has an electronic depth stop comprising a sensor for non-contact gauging of distance and a calculator component for calculating the depth of a drill bit tip relative to a reference surface a and for signaling when a measured value reaches a set value, whereby the set value is transferable into the set value program memory by a single manually actuated transfer accept means.

A very easy to use and acceptable entry method for the construction industry is provided as a result of the transfer of the set value by the simple actuation of the transfer accept actuation means. Preferably, in the case of the reference blind bore hole, this transfer is done by a transfer of the measured value, as the set value for a series of other holes, or by direct considerations of the fastener means to be installed into the blind bore hole at the time of measurement. For example, the measurement beam for the lengthwise measurement is directed onto the fastening means arranged next to the tool tip set up on the reference surface.

Preferably, the transfer accept actuation means is a resilient spring-loaded transfer button; Preferably, the button has a large surface area such that it can be actuated with protective gloves, and whereby a technologically simple, intuitive switch means is created.

Preferably, the resilient spring-loaded transfer button is combined with the stronger resilient spring-loaded motor switch and a timer on the hand grip of the hand tool device, whereby, on actuation of the transfer button, a pressure point that is felt by the user is formed, which, when actuated for a minimum period, causes transfer into the measured value memory.

Preferably, the hand tool device is equipped with a simple acoustical and/or luminous signaling means, such as a beeper or light emitting diode, that signals the transfer of the set value and when the set value is reached by the measured value.

Preferably, a manually actuated correction means, for incremental correction of the transferred measured values in the directions of both decreasing or increasing set value, is arranged on the transfer accept actuation means, whereby simple intuitive change of the set value is possible.

Preferably, a numerical display is visibly arranged on the hand tool device, which, at least temporarily, displays a numerical set value.

Preferably, the hand tool device has a data communication interface, for example a transponder emitter/receiver or a laser scanner. A setting depth transferred to the data communication interface, on the hand tool device, by a fastener situated in the communication range or its packaging or a special device like a mobile communication device, is taken into account upon operating the actuation means such that, at the time of calculation of the set value, the setting depth is subtracted from the measured value, when the tool tip set is upon the reference surface.

Preferably, with an additional length transmitted by the tool, the transmitted setting depth is subtracted from the transmitted tool length at the time of calculation of the set value.

BRIEF DESCRIPTION OF THE DRAWINGS

The invention is more completely described using an advantageous exemplary embodiment read together with the drawings, wherein:

FIG. 1a is a representation of a hand tool device with an electronic depth stop, in accordance with the invention.

FIG. 1b is a representation a cross-section of the hand tool of FIG. 1a, in accordance with the invention.

DETAILED DESCRIPTION OF THE INVENTION

According to FIG. 1a, a hand tool device 1, e.g., a hammer drill, comprises an at least partially rotationally driven drill bit 2, an electronic depth stop 3 with a run-time sensitive laser measurement system, as the sensor 4, and a calculator component 5 including a microprocessor with a set value memory 6 for a set value S, and a timer 7 for transferring the pressure point into the set value memory, upon actuation, for a period of approximately 1 second. A measured value M, indirectly determining the momentary depth T of a drill bit tip 8 in a blind bore hole 9, is determined with respect to the distance from the sensor 4 relative to a reference surface 10. On its hand grip, the hand tool device 1 has a pressure actuated motor switch 11 having a large surface area transfer button 12 that can be manually actuated. Two differently colored light emitting diodes are visibly arranged on the hand tool, as signal means 13, for signaling a measured value M attaining the set value S. Two large surface area correction means 14a, 14b, in the form of Up-Down buttons, and a numerical display 15 are visibly arranged on the top part of the hand tool device 1 and can be manually actuated. A data communications interface 16 executed, as a transponder emitter/receiver, on the hand tool device 1, communicates with transponders 17, 17' in the drill bit 2, and a fastener means 18 arranged in space, and in the form of an anchor with a specific, assigned setting depth U, as shown in FIG. 1a.

What is claimed is:

1. A hand tool device for an at least partially rotationally driven drill bit (2) comprising an electronic depth stop (3) with a sensor (4) for non-contact distance gauging and a calculator component (5) for calculating the depth (T) of a drill bit tip (8) relative to a reference surface (10) and for signaling when a measured value attains a set value (S), wherein the set value (S) is transferable into a set value memory (6) via a single manually actuated transfer accept actuation means located on a pressure actuated motor switch (11) on a hand grip of the hand tool device.

2. The hand tool device of claim 1, wherein the transfer accept actuation means is a resilient spring-loaded, transfer button (12).

3. The hand tool device of claim 2, wherein the transfer button (12) is functionally connected to the calculator component (5) including a timer (7) for transferring the pressure point into the set value memory (6), upon action, for a minimum period.

4. The hand tool device of claim 1, further comprising at least one of a simple acoustical means and a luminous signaling means (13).

5. The hand tool device of claim 1, further comprising a manually operated correction means (14a, 14b) associated with the transfer accept actuation means for the incremental correction of the transferred measured value (M) in both an increasing and decreasing set value (S).

6. The hand tool device of claim 1, further comprising a wireless data communications interface (16) for transmitting a setting depth (U) to the calculator component (5) from one of a fastening means (18) and a mobile communication device situated in the communication range.

7. The hand tool device of claim 2, wherein the transfer button (12) has large surface area for actuating with protective gloves.

8. The hand tool device of claim 6, wherein the data communications interface (16) may also transmit the tool length of the drill bit to the calculator component (5).

* * * * *